United States Patent
Kendall et al.

(10) Patent No.: US 12,284,255 B2
(45) Date of Patent: Apr. 22, 2025

(54) SYSTEM AND METHOD FOR GENERATING TWO-SIDED ELECTRONIC INTERACTION REQUESTS FOR COMPLETING RESOURCE TRANSFERS

(71) Applicant: BANK OF AMERICA CORPORATION, Charlotte, NC (US)

(72) Inventors: Charles Russell Kendall, Snoqualmie, WA (US); Richard C. Clow, II, Morristown, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 289 days.

(21) Appl. No.: 17/409,366

(22) Filed: Aug. 23, 2021

(65) Prior Publication Data
US 2023/0054343 A1    Feb. 23, 2023

(51) Int. Cl.
*H04L 67/53*   (2022.01)
*G06F 9/50*    (2006.01)
*H04L 47/70*   (2022.01)

(52) U.S. Cl.
CPC .......... *H04L 67/53* (2022.05); *G06F 9/5005* (2013.01); *H04L 47/82* (2013.01)

(58) Field of Classification Search
CPC .... H04L 67/53; H04L 12/2809; G06F 9/5005
USPC .......... 709/220, 224, 225, 226, 228
See application file for complete search history.

(56) References Cited

U.S. PATENT DOCUMENTS

| | | | |
|---|---|---|---|
| 8,700,392 B1 * | 4/2014 | Hart | G10L 15/25 |
| | | | 704/231 |
| 10,732,624 B2 * | 8/2020 | Nelson | H04L 63/0861 |
| 10,915,227 B1 * | 2/2021 | Proud | G06F 9/451 |
| 2009/0000187 A1 * | 1/2009 | Sayers | A01H 1/027 |
| | | | 47/1.41 |
| 2018/0101855 A1 * | 4/2018 | Deluca | G06Q 30/0257 |
| 2018/0102935 A1 * | 4/2018 | Curtis | H04L 43/045 |
| 2018/0102936 A1 * | 4/2018 | Curtis | H04L 41/06 |
| 2018/0137501 A1 * | 5/2018 | Condon | G06Q 20/327 |
| 2018/0337925 A1 * | 11/2018 | Wallace | H04L 9/3234 |
| 2018/0376378 A1 * | 12/2018 | Greene | G06Q 20/3265 |
| 2019/0227673 A1 * | 7/2019 | Wekke | G06F 3/167 |

(Continued)

FOREIGN PATENT DOCUMENTS

AU    2008203853 B2 *  11/2009  ............. G01V 11/00

*Primary Examiner* — Khanh Q Dinh
(74) *Attorney, Agent, or Firm* — Moore & Van Allen PLLC; Anoohya Yarlagadda

(57) ABSTRACT

Embodiments of the present invention provide a system for generating two-sided electronic interaction requests for completing resource transfers. In particular, the system may be configured to cause an entity system to transmit interaction data associated with an interaction between a user and a third party system, receive, from an entity system, the interaction data of the interaction associated with the user and the third party system, cause the third party system to generate a resource transfer request associated with the interaction, receive, from the third party system, the resource transfer request associated with the interaction, determine that the interaction data matches data accompanied by the resource transfer request for transfer of resources associated with the interaction, and route the resource transfer request to a settlement system to process the interaction and complete the transfer of resources associated with the interaction.

14 Claims, 5 Drawing Sheets

(56) References Cited

U.S. PATENT DOCUMENTS

| | | | | |
|---|---|---|---|---|
| 2019/0359160 A1* | 11/2019 | Nelson | .................... | H04W 4/40 |
| 2020/0111086 A1* | 4/2020 | Castinado | .............. | G06Q 20/12 |
| 2020/0112518 A1* | 4/2020 | Castinado | ............. | H04L 67/535 |
| 2020/0242509 A1* | 7/2020 | Clow, II | ................. | G06F 16/214 |
| 2022/0000187 A1* | 1/2022 | Li | ........................ | A41D 13/129 |
| 2022/0019483 A1* | 1/2022 | duPont | ................. | G06F 9/5083 |
| 2022/0019484 A1* | 1/2022 | duPont | ................. | G06F 9/5083 |

\* cited by examiner

SYSTEM AND METHOD FOR GENERATING TWO-SIDED ELECTRONIC INTERACTION REQUESTS FOR COMPLETING RESOURCE TRANSFERS

BACKGROUND

Conventional systems do not have the capability to route and process interactions based on requirements of third party systems or users associated with the interactions. As such, there exists a need for a system to route interactions to process and complete the transfer of resources associated with the interactions that satisfy one or more conditions.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for generating two-sided electronic interaction request for completing resource transfers. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention In some embodiments, the invention causes an entity system to transmit interaction data associated with an interaction between a user and a third party system, wherein the interaction data comprises at least information identifying the user, information identifying resource instrument used to initiate the interaction, and resource amount associated with the interaction, receives, from an entity system, the interaction data of the interaction associated with the user and the third party system, causes the third party system to generate a resource transfer request associated with the interaction, wherein the resource transfer request comprises at least the information identifying the user, the information identifying resource instrument used to conduct the interaction, and the resource amount, receives, from the third party system, the resource transfer request associated with the interaction, determines that the interaction data matches data accompanied by the resource transfer request for transfer of resources associated with the interaction, and routes the resource transfer request to a settlement system to process the interaction and complete the transfer of resources associated with the interaction.

In some embodiments, the invention receives an interaction routing request from the user via a user device, wherein the interaction routing request is associated with routing all interactions initiated using the resource instrument to the settlement system.

In some embodiments, the invention receives an interaction routing request from the user via a user device, wherein the interaction routing request is associated with routing all interactions initiated using the resource instrument to an account associated with another resource instrument to be processed via the settlement system.

In some embodiments, the invention receives, from the third party system, an interaction data routing request, wherein the data routing request comprises a preferred mode of the transfer of resources associated with the interaction, wherein the preferred mode of the transfer of resources is via the settlement system.

In some embodiments, the invention causes the third party system to communicate with an interaction device to gather the data associated with the interaction.

In some embodiments, the interaction device is a point of sale device.

In some embodiments, the resource instrument comprises a special indicia that is readable by the interaction device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
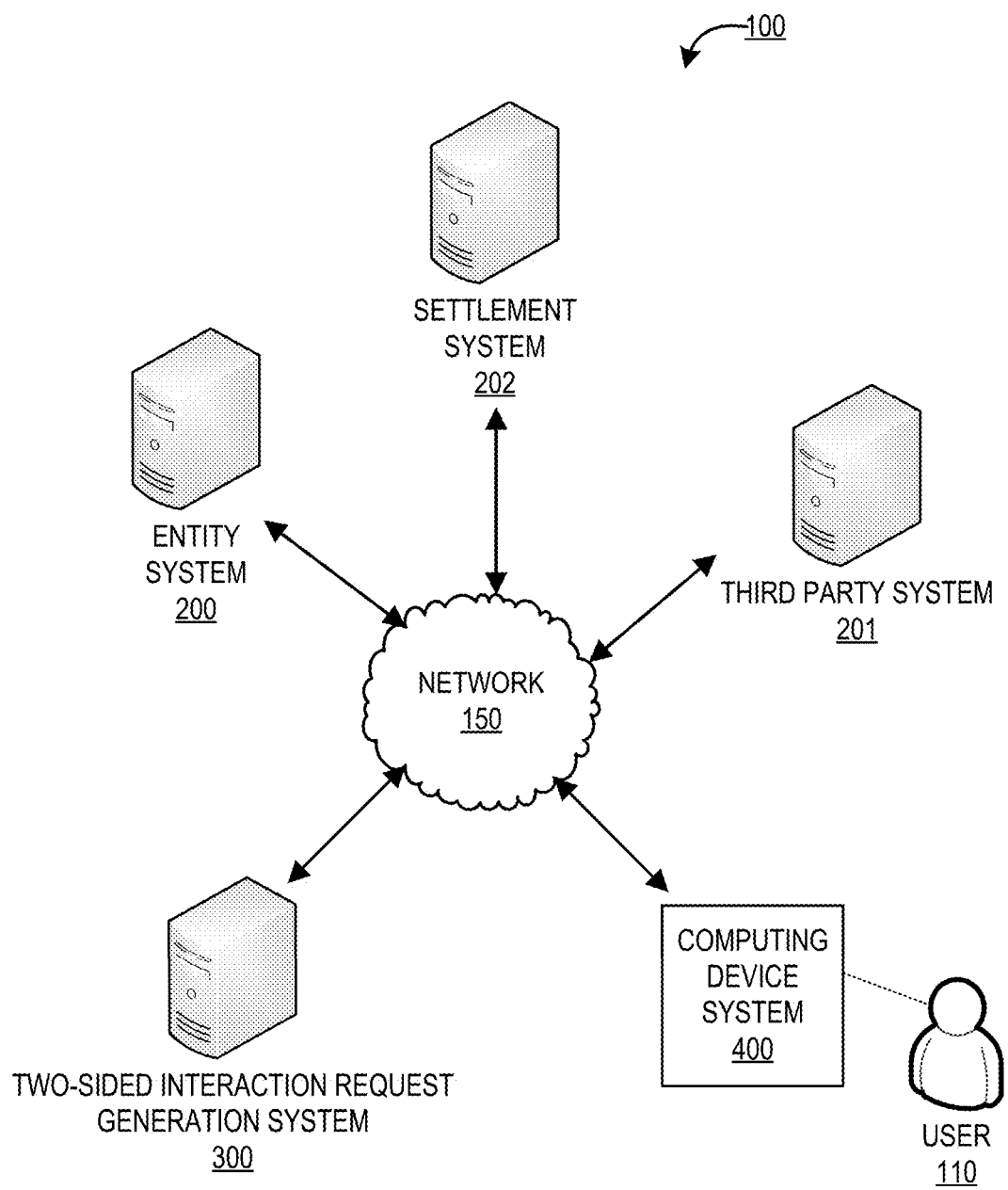
Figure 2:
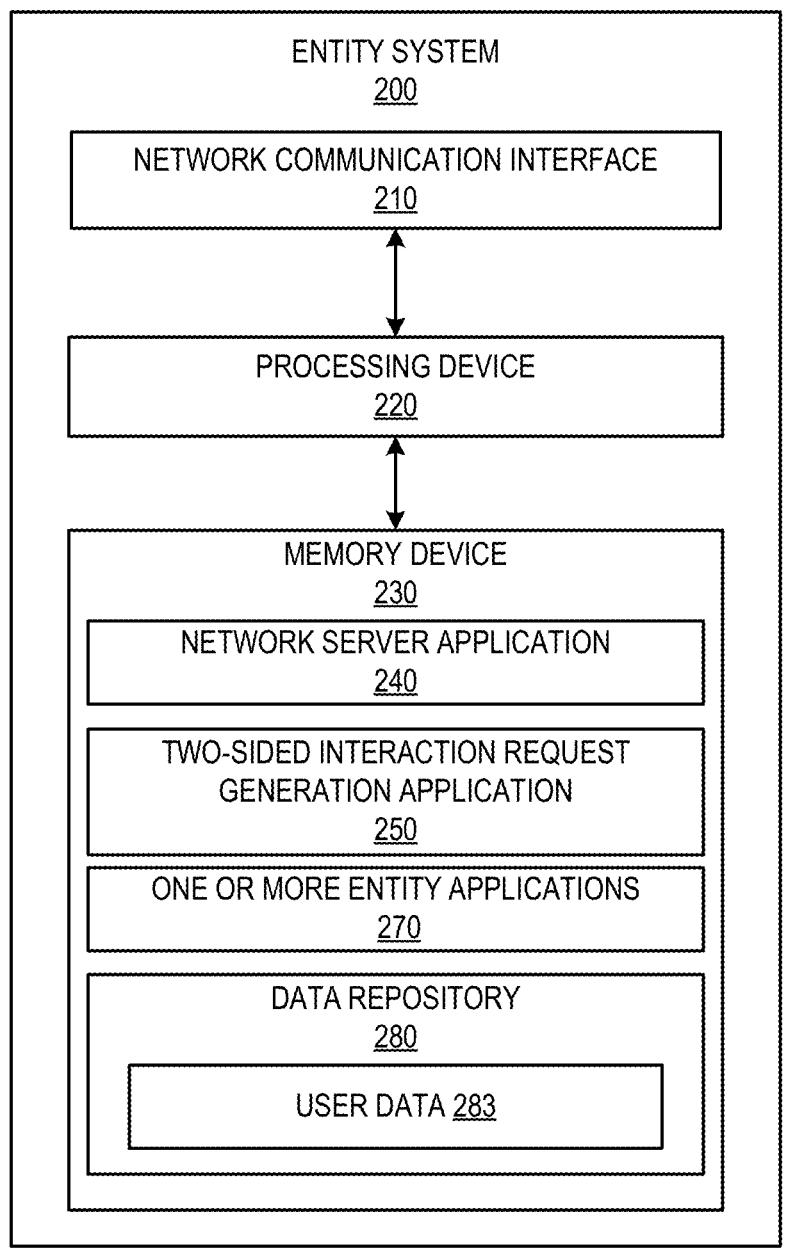
Figure 3:
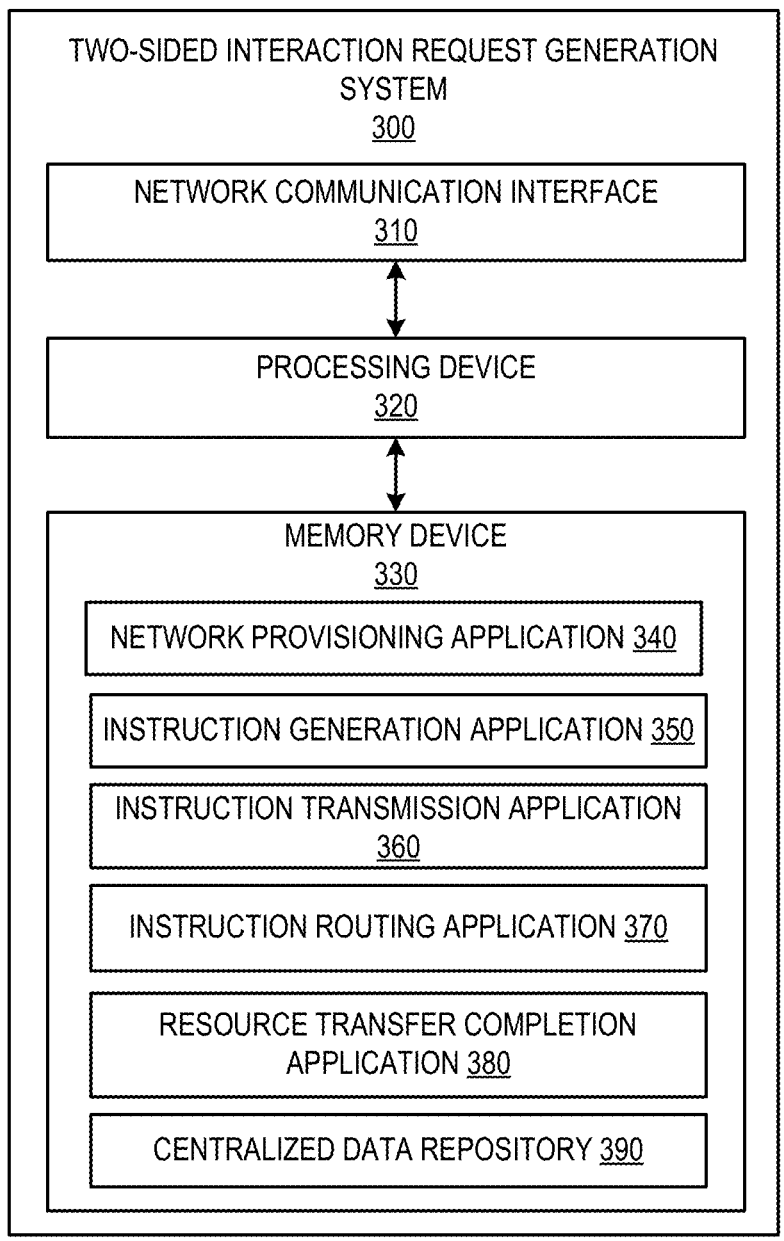
Figure 4:
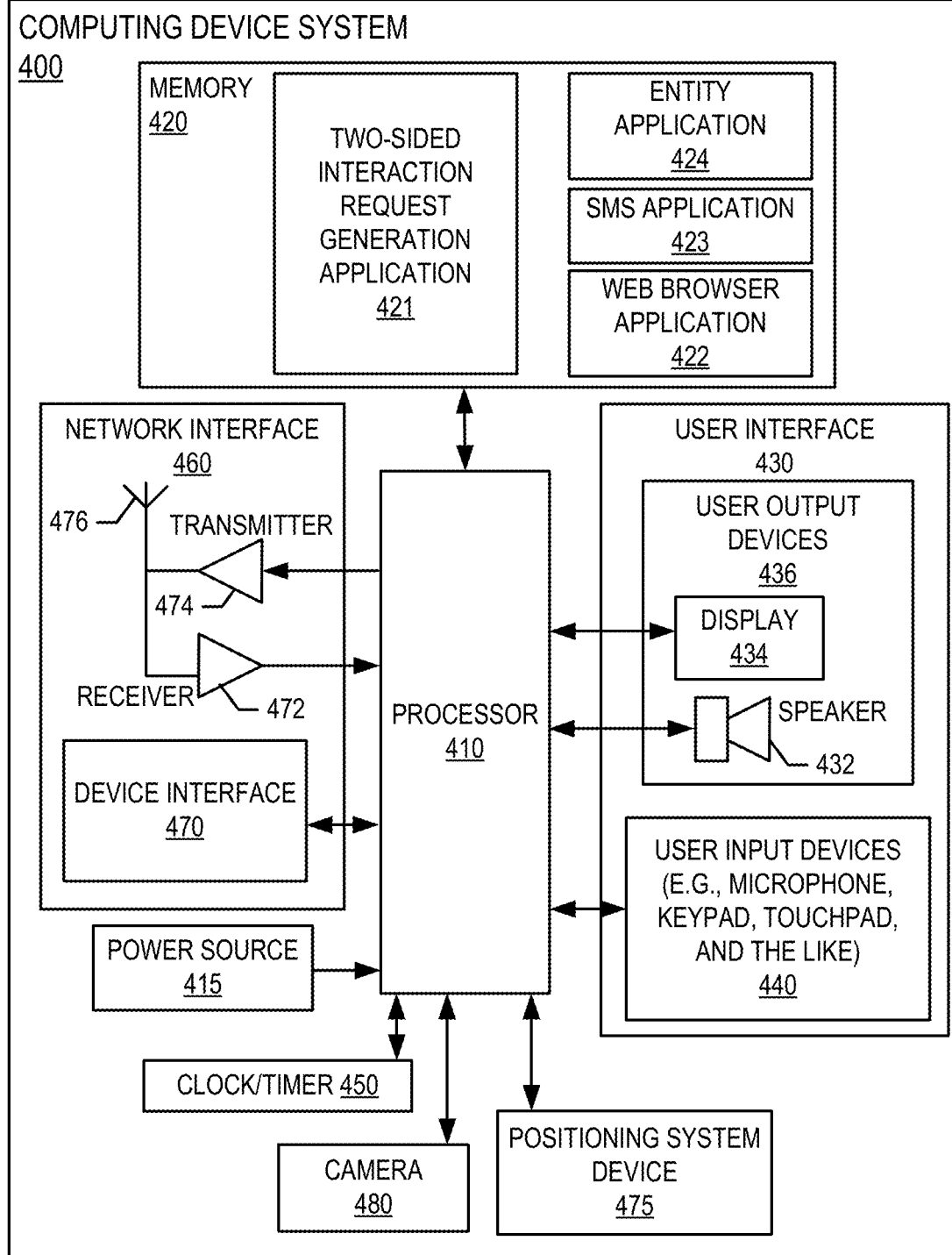
Figure 5:
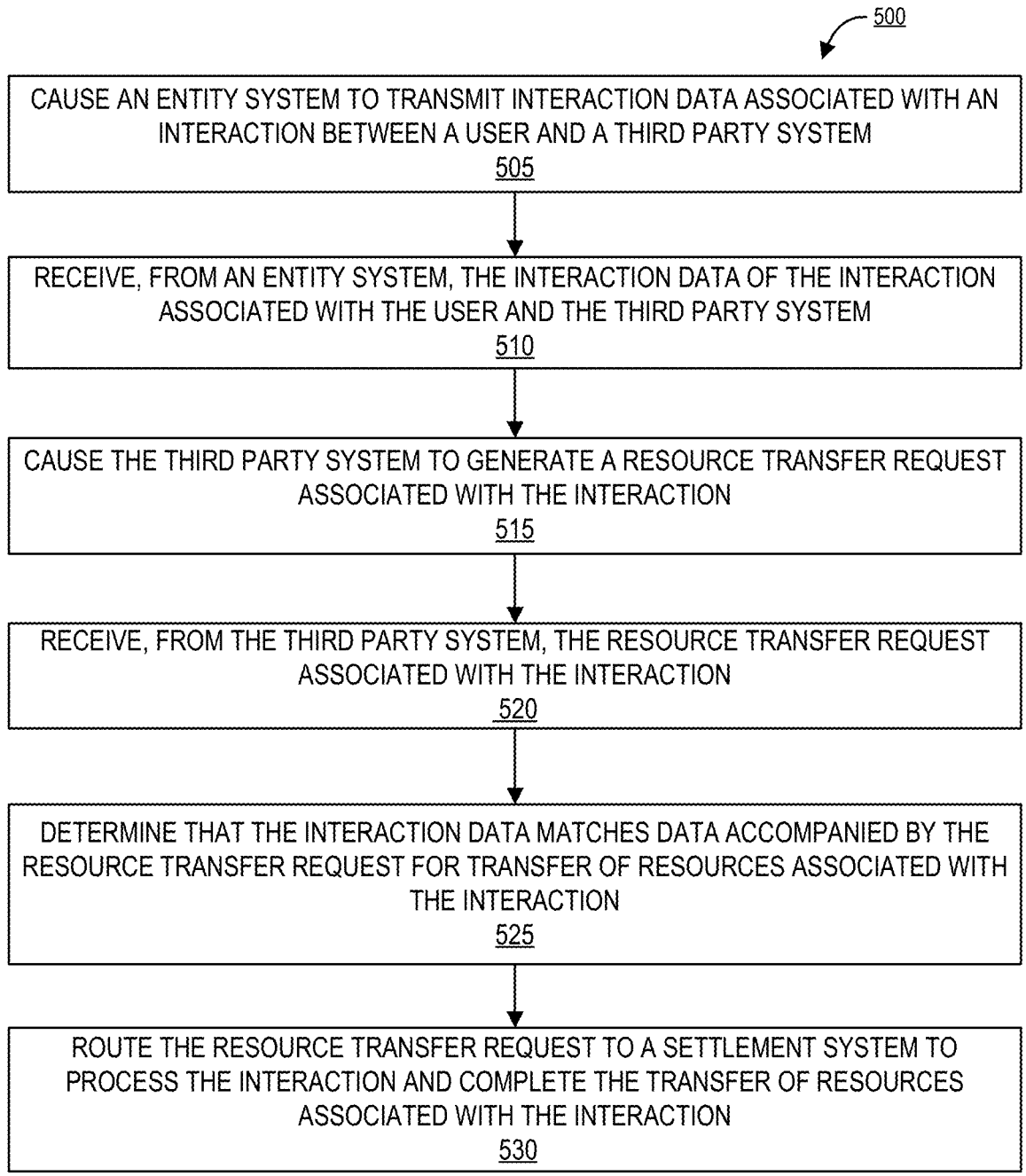

Having thus described embodiments of the invention in general terms, reference will now be made to the accompanying drawings, wherein:

FIG. 1 provides a block diagram illustrating a system environment for generating two-sided electronic interaction request for completing resource transfers, in accordance with an embodiment of the invention;

FIG. 2 provides a block diagram illustrating the entity system 200 of FIG. 1, in accordance with an embodiment of the invention;

FIG. 3 provides a block diagram illustrating a two-sided interaction request generation system 300 of FIG. 1, in accordance with an embodiment of the invention;

FIG. 4 provides a block diagram illustrating the computing device system 400 of FIG. 1, in accordance with an embodiment of the invention; and FIG. 5 provides a block diagram illustrating a process flow for generating two-sided electronic interaction request for completing resource transfers, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As used herein, the term "resource entity" or "entity" may be any institution which involves in financial interactions. In one embodiment, the term "entity" or "resource entity" may be any financial institution. As used herein, a "resource entity system" may be any system utilized by the entity to facilitate and process the financial interactions. As used herein, a "third party system" may be a financial institution system associated with a third party, where the third party is a merchant who provides products, goods, and/or services to users of the entity. As used herein, a "settlement system" may be any settlement network that may be involved in settlement of transactions. In some embodiments, the settlement system may be the resource entity system.

As used herein, an "interaction" or a "transaction" as used herein may refer to transfer of resources (e.g., funds) between a user and a third party for purchasing or selling of a product to the user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. "Resource instrument" or "instrument" as defined herein may refer to any instrument that can be utilized to facilitate the transfer of resources (e.g., credit card, debit card, gift card, loyalty card, check, or the like).

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Merchants or third-party systems that collect payments often accept a limited number of interaction types, such as particular credit card networks or the like. Typically, when a merchant does not accept a preferred resource instrument of a user, the user must use a secondary resource instrument associated with a secondary entity or source retainer to complete resource transfers. Currently, if a user wants to complete a resource transfer using a preferred source retainer associated with a preferred resource instrument which is not accepted by a merchant, the user has no option for completing said transfer. As such, a need exists for a user to be able to associate a single resource instrument with multiple source retainers associated other resource instruments, in order to flexibly complete a resource transfer based on a particular merchant's or third party system's or user's requirements. The system of the present invention solves the aforementioned problem as explained below.

FIG. 1 provides a block diagram illustrating a system environment 100 for generating two-sided electronic interaction request for completing resource transfers, in accordance with an embodiment of the invention. As illustrated in FIG. 1, the environment 100 includes a two-sided interaction request generation system 300, entity system 200, a third party system 201, a settlement system 202, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. In some embodiments, the entity is a financial institution.

The two-sided interaction request generation system 300 is a system of the present invention for performing one or more process steps described herein. In some embodiments, the two-sided interaction request generation system 300 may be an independent system. In some embodiments, the two-sided interaction request generation system 300 may be a part of the entity system 200.

The two-sided interaction request generation system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the two-sided interaction request generation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the two-sided interaction request generation system 300, and/or entity system 200 across the network 150. In some embodiments of the invention, the computing device system 400 may be a mobile device.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a two-sided interaction request generation application 250, one or more entity applications 270, and a data repository 280 comprising user data 283, where the user data 283 comprises data associated with users 110 and/or one or more resource pools associated with the users 110. The one or more entity applications 270 may be any applications provided by the entity that allows users 110 to access information and/or perform one or more actions associated with one or more resource pools of the users 110. The computer-executable program code of the network server application 240, the two-sided interaction request generation application 250, the one or more entity application 270 to perform certain logic, data-extraction, and data-storing functions of the entity system 200 described herein, as well as communication functions of the entity system 200.

The network server application 240, the two-sided interaction request generation application 250, and the one or more entity applications 270 are configured to store data in the data repository 280 or to use the data stored in the data repository 280 when communicating through the network communication interface 210 with the two-sided interaction request generation system 300, and/or the computing device system 400 to perform one or more process steps described herein. In some embodiments, the entity system 200 may receive instructions from the two-sided interaction request generation system 300 via the two-sided interaction request generation application 250 to perform certain operations. The two-sided interaction request generation application 250 may be provided by the two-sided interaction request generation system 300. In some embodiments, the two-sided interaction request generation system 300 causes the entity system to perform one or more steps as explained in FIG. 5 below, via the two-sided interaction generation application 250. Similarly, the third party system 201 may have an application that is provided by the two-sided interaction request generation system 300 to perform one or more steps as explained in FIG. 5.

FIG. 3 provides a block diagram illustrating the two-sided interaction request generation system 300 in greater detail, in accordance with embodiments of the invention. As illustrated in FIG. 3, in one embodiment of the invention, the two-sided interaction request generation system 300 includes one or more processing devices 320 operatively coupled to a network communication interface 310 and a memory device 330. In certain embodiments, the two-sided interaction request generation system 300 is operated by a first entity, such as a financial institution, while in other embodiments, the two-sided interaction request generation system 300 is operated by an entity other than a financial institution. In some embodiments, the two-sided interaction request generation system 300 is owned or operated by the entity of the entity system 200. In some embodiments, the two-sided interaction request generation system 300 may be an independent system. In alternate embodiments, the two-sided interaction request generation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the two-sided interaction request generation system 300 described herein. For example, in one embodiment of the two-sided interaction request generation system 300, the memory device 330 includes, but is not limited to, a network provisioning application 340, an instruction generation application 350, an instruction transmission application 360, an instruction routing application 370, a resource transfer completion application 380, and a centralized data repository 390 comprising data processed or accessed by one or more applications in the memory device 330. The computer-executable program code of the network provisioning application 340, the instruction generation application 350, the instruction transmission application 360, the instruction routing application 370, and the resource transfer completion application 380 may instruct the processing device 320 to perform certain logic, data-processing, and data-storing functions of the two-sided interaction request generation system 300 described herein, as well as communication functions of the two-sided interaction request generation system 300.

The network provisioning application 340, the instruction generation application 350, the instruction transmission application 360, the instruction routing application 370, and the resource transfer completion application 380 are configured to invoke or use the data in the data repository 390 when communicating through the network communication interface 310 with the entity system 200, and/or the computing device system 400. In some embodiments, the network provisioning application 340, the instruction generation application 350, the instruction transmission application 360, the instruction routing application 370, and the resource transfer completion application 380 may store the data extracted or received from the entity system 200, and the computing device system 400 in the centralized data repository 390. In some embodiments, the network provisioning application 340, the instruction generation application 350, the instruction transmission application 360, the instruction routing application 370, and the resource transfer completion application 380 may be a part of a single application. The functionalities of the network provisioning application 340, the instruction generation application 350, the instruction transmission application 360, the instruction routing application 370, and the resource transfer completion application 380 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a two-sided interaction request generation application 421, entity application 424, an SMS application 423, or the like. In some embodiments, the entity application 424 may be an online banking application. The two-sided interaction request generation application 421 may comprise instructions to a graphical user interface (GUI) on the display 430 that allows the user 110 to interact with the entity system 200, the two-sided interaction request generation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the two-sided interaction request generation application 421 provided by the two-sided interaction request generation system 300 allows the user 110 to access the two-sided interaction request generation system 300. In some embodiments, the entity application 424 provided by the entity system 200 and the two-sided interaction request generation application 421 allow the user 110 to access the functionalities provided by the two-sided interaction request generation system 300 and the entity system 200. In some embodiments, the entity application 424 may be an online banking application.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating a process flow 500 for generating two-sided electronic interaction request for completing resource transfers, in accordance with an embodiment of the invention.

As shown in block 505, the system causes an entity system to transmit interaction data associated with an interaction between a user and a third party system. The interaction may be initiated by the user at a third party location via an interaction device. The interaction device may be a Point Of Sale (POS) device. The interaction data comprises at least information identifying the user, information identifying resource instrument used to initiate the interaction, and resource amount associated with the interaction. For example, the entity system may receive information from the interaction device about the interaction initiated by the user and the system may cause the entity system to transmit the interaction data back to the system by transmitting one or more instructions. As shown in block 510, the system receives, from an entity system, the interaction data of the interaction associated with the user and the third party system.

As shown in block 515, the system causes the third party system to generate a resource transfer request associated with the interaction. After the interaction is initiated by the user at the interaction device, the interaction device transmits information associated with the interaction to the third party system along with the entity system. For example, the third party system may receive information from the interaction device about the interaction initiated by the user and the system may cause the third party system to transmit the interaction data back to the system by transmitting one or more instructions to the third party system, via an application provided by the system to the third party system. As shown in block 520, the system receives, from the third party system, the resource transfer request associated with the interaction.

As shown in block 525, the system determines that the interaction data matches data accompanied by the resource transfer request for transfer of resources associated with the interaction. For example, the system may verify that the resource amount received from the entity system matches the resource amount received from the third party system.

As shown in block 530, the system routes the resource transfer request to a settlement system to process the interaction and complete the transfer of resources associated with the interaction. The settlement system may be a settlement network that processes the one or more interactions in a specific way. For example, the settlement network may settle transactions in the form of cash transfer, RTP transfer, wire transfer, card network, ACH transfer, or the like.

In some embodiments, the user may select that all interactions initiated by the resource instrument to be settled via a certain settlement network. For example, the user may specify that all transaction initiated using a first credit card be processed and settled via an RTP settlement network. In some embodiments, the system receives an interaction routing request from the user via a user device, wherein the interaction routing request is associated with routing all interactions initiated using the resource instrument to the settlement system. In some embodiments, the resource instrument may be special instrument comprising a special indicia that is scannable by the interaction device, where the special indicia indicates special routing information associated with the resource instrument. For example, the special indicia may be a scannable code or a logo that allows the entity system and the system of the present invention to know that all interactions initiated using the resource instrument comprising the special indicia have to be routed through a certain network (e.g., the settlement network). In some embodiments, the system after receiving the indication of the special indicia on the resource instrument will automatically route all the interactions that are initiated using the resource instrument to be processed by the settlement system. In some embodiments, the system the system after receiving the indication of the special indicia on the resource instrument will all interactions that are initiated using the resource instrument based on user instructions.

In some embodiments, the system receives an interaction routing request from the user via a user device, wherein the interaction routing request is associated with routing all interactions initiated using the resource instrument to an account associated with another resource instrument to be processed via the settlement system. For example, the user may prefer to perform all transactions via a secondary credit card and merchants involved in the transactions may not accept transactions from the secondary credit card. The system allows the user to perform transaction using a first credit card that is accepted by the merchants and then route the transaction to be processed from an account associated with the secondary credit card, via the settlement network (e.g., RTP network, cash, ACH network, or the like).

In some embodiments, the system receives, from the third party system, an interaction data routing request, wherein the data routing request comprises a preferred mode of the transfer of resources associated with the interaction, wherein the preferred mode of the transfer of resources is via the settlement system. For example, some merchants may prefer cash transfers. In such exemplary embodiments, the entity system may act as the settlement network to process and complete transfer of resources in the form of cash. In another example, some merchants may prefer receiving resource via an RTP network. In some embodiments, merchant financial institution may prefer receiving resources associated with all interactions via ACH transfer from user's financial institution (e.g., the entity system). The system allows routing of transactions as explained above based on preferences of the user, the third party (e.g., merchant), and/or the third party system (e.g., merchant financial institution).

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions or executable portions embodied therein.

It will also be understood that one or more computer-executable program code portions or instruction code for carrying out or performing the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating two-sided electronic interaction requests for completing resource transfers, the system comprising:

a memory device with computer-readable program code stored thereon;

a communication device; and a processing device operatively coupled to the memory device and the communication device, wherein the processing device is configured to execute the computer-readable program code to:

cause an entity system to transmit interaction data associated with an interaction between a user and a third party system initiated by the user via an interaction device at a third party location, wherein the interaction data comprises at least information identifying the user, information identifying resource instrument comprising scannable special indicia used to initiate the interaction, and resource amount associated with the interaction, wherein the scannable special indicia is readable by the interaction device;

receive, from the entity system, the interaction data of the interaction associated with the user and the third party system;

receive, from the third party system, a resource transfer request associated with the interaction, wherein the resource transfer request comprises at least the information identifying the user, the information identifying the resource instrument used to conduct the interaction, and the resource amount;

determine that the interaction data matches data accompanied by the resource transfer request for transfer of resources associated with the interaction;

determine one or more accepted settlement systems associated with the third party system, wherein the one or more accepted settlement systems each correspond to an accepted settlement network;

determine a plurality of user settlement systems, wherein the plurality of user settlement systems indicate a plurality of settlement networks in which the transfer is capable of being completed by the user, wherein the plurality of user settlement systems comprises a preferred user settlement system and one or more secondary user settlement systems, wherein the preferred user settlement system is determined based at least in part on the scannable special indicia in the interaction data;

in an instance in which the preferred user settlement system is included in the one or more accepted settlement systems, route the resource transfer request to the preferred user settlement system to process the interaction and complete the transfer of resources associated with the interaction; and in an instance in which the preferred user settlement system is not included in the one or more accepted settlement systems associated with the third party system, route the resource transfer request to one of the one or more secondary user settlement systems, wherein the one of the one or more secondary user settlement systems in which the resource transfer request is routed is included in the one or more accepted settlement systems.

2. The system of claim 1, wherein the processing device is further configured to execute the computer-readable program code to:

receive an interaction routing request from the user via a user device, wherein the interaction routing request is associated with routing all interactions initiated using the resource instrument to the preferred user settlement system, wherein the interaction is routed to the preferred user settlement system via the one of the one or more secondary user settlement systems in which the resource transfer request is routed in an instance in which the preferred user settlement system is not included in the one or more accepted settlement systems.

3. The system of claim 1, wherein the processing device is further configured to execute the computer-readable program code to:

receive an interaction routing request from the user via a user device, wherein the interaction routing request is associated with routing all interactions initiated using the resource instrument to an account associated with another resource instrument to be processed via one of the secondary user settlement system.

4. The system of claim 1, wherein the processing device is configured to execute the computer-readable program code to:

receive data associated with the interaction from the third party system, wherein the data is gathered from the interaction device.

5. The system of claim 4, wherein the interaction device is a point of sale device.

6. A computer program product for generating two-sided electronic interaction requests for completing resource transfers, the computer program product comprising at least one non-transitory computer readable medium having computer-readable program code portions embodied therein, the computer-readable program code portions comprising executable portions for:

causing an entity system to transmit interaction data associated with an interaction between a user and a third party system initiated by the user via an interaction device at a third party location, wherein the interaction data comprises at least information identifying the user, information identifying resource instrument comprising scannable special indicia used to initiate the interaction, and resource amount associated with the interaction, wherein the scannable special indicia is readable by the interaction device;

receiving, from the entity system, the interaction data of the interaction associated with the user and the third party system;

receiving, from the third party system, a resource transfer request associated with the interaction, wherein the resource transfer request comprises at least the information identifying the user, the information identifying the resource instrument used to conduct the interaction, and the resource amount;

determining that the interaction data matches data accompanied by the resource transfer request for transfer of resources associated with the interaction;

determining one or more accepted settlement systems associated with the third party system, wherein the one or more accepted settlement systems each correspond to an accepted settlement network;

determining a plurality of user settlement systems, wherein the plurality of user settlement systems indicate a plurality of settlement networks in which the transfer is capable of being completed by the user, wherein the plurality of user settlement systems comprises a preferred user settlement system and one or more secondary user settlement systems, wherein the preferred user settlement system is determined based at least in part on the scannable special indicia in the interaction data;

in an instance in which the preferred user settlement system is included in the one or more accepted settlement systems, routing the resource transfer request to the preferred user settlement system to process the interaction and complete the transfer of resources associated with the interaction; and in an instance in which the preferred user settlement system is not included in the one or more accepted settlement systems associated with the third party system, routing the resource transfer request to one of the one or more secondary user settlement systems, wherein the one of the one or more secondary user settlement systems in which the resource transfer request is routed is included in the one or more accepted settlement systems.

7. The computer program product of claim 6, wherein the computer-readable program code portions comprising executable portions for receiving an interaction routing request from the user via a user device, wherein the interaction routing request is associated with routing all interactions initiated using the resource instrument to the preferred user settlement system, wherein the interaction is routed to the preferred user settlement system via the one of the one or more secondary user settlement systems in which the resource transfer request is routed in an instance in which the preferred user settlement system is not included in the one or more accepted settlement systems.

8. The computer program product of claim 6, wherein the computer-readable program code portions comprising executable portions for receiving an interaction routing request from the user via a user device, wherein the interaction routing request is associated with routing all interactions initiated using the resource instrument to an account associated with another resource instrument to be processed via one of the secondary user settlement system.

9. The computer program product of claim 6, wherein the computer-readable program code portions comprising executable portions for receive data associated with the interaction from the third party system, wherein the data is gathered from the interaction device.

10. The computer program product of claim 9, wherein the interaction device is a point of sale device.

11. A computer-implemented method for generating two-sided electronic interaction requests for completing resource transfers, the method comprising:

causing an entity system to transmit interaction data associated with an interaction between a user and a third party system initiated by the user via an interaction device at a third party location, wherein the interaction data comprises at least information identifying the user, information identifying resource instrument comprising scannable special indicia used to initiate the interaction, and resource amount associated with the interaction, wherein the scannable special indicia is readable by the interaction device;

receiving, from the entity system, the interaction data of the interaction associated with the user and the third party system;

receiving, from the third party system, a resource transfer request associated with the interaction, wherein the resource transfer request comprises at least the information identifying the user, the information identifying the resource instrument used to conduct the interaction, and the resource amount;

determining that the interaction data matches data accompanied by the resource transfer request for transfer of resources associated with the interaction;

determining one or more accepted settlement systems associated with the third party system, wherein the one or more accepted settlement systems each correspond to an accepted settlement network;

determining a plurality of user settlement systems, wherein the plurality of user settlement systems indicate a plurality of settlement networks in which the transfer is capable of being completed by the user, wherein the plurality of user settlement systems comprises a preferred user settlement system and one or more secondary user settlement systems, wherein the preferred user settlement system is determined based at least in part on the scannable special indicia in the interaction data;

in an instance in which the preferred user settlement system is included in the one or more accepted settlement systems, routing the resource transfer request to the preferred user settlement system to process the interaction and complete the transfer of resources associated with the interaction; and in an instance in which the preferred user settlement system is not included in the one or more accepted settlement systems associated with the third party system, routing the resource transfer request to one of the one or more secondary user settlement systems, wherein the one of the one or more secondary user settlement systems in which the resource transfer request is routed is included in the one or more accepted settlement systems.

12. The computer-implemented method of claim 11, wherein the method comprises receiving an interaction routing request from the user via a user device, wherein the interaction routing request is associated with routing all interactions initiated using the resource instrument to the preferred user settlement system, wherein the interaction is routed to the preferred user settlement system via the one of the one or more secondary user settlement systems in which the resource transfer request is routed in an instance in which the preferred user settlement system is not included in the one or more accepted settlement systems.

13. The computer-implemented method of claim 11, wherein the method comprises receiving an interaction routing request from the user via a user device, wherein the interaction routing request is associated with routing all interactions initiated using the resource instrument to an account associated with another resource instrument to be processed via one of the secondary user settlement system.

14. The computer-implemented method of claim 11, wherein the method comprises receiving data associated with the interaction from the third party system, wherein the data is gathered from the interaction device.

* * * * *